United States Patent [19]

Zwick

[11] Patent Number: 4,826,235
[45] Date of Patent: May 2, 1989

[54] EXPANDABLE BED ASSEMBLY FOR CAMPING TRAILER

[75] Inventor: David J. Zwick, Stoystown, Pa.

[73] Assignee: The Coleman Company, Inc., Wichita, Kans.

[21] Appl. No.: 144,563

[22] Filed: Jan. 15, 1988

[51] Int. Cl.4 .............................. B60P 3/38; B60P 3/34
[52] U.S. Cl. ........................................ 296/170; 5/118; 296/169
[58] Field of Search .................... 5/118, 8, 9; 296/169, 296/170, 171, 174, 175

[56] References Cited

U.S. PATENT DOCUMENTS 3,475,047 10/1969 Daniels .................................. 296/170
3,575,460 4/1971 Kennedy ..................................... 5/8
3,697,121 10/1972 Park ...................................... 296/170
4,463,982 8/1984 Irelan ..................................... 296/170

Primary Examiner—Alexander Grosz

[57] ABSTRACT

An expandable bed assembly for a camping trailer is mounted on a pair of extension rails which are slidably mounted on the camping trailer. A first bed frame and mattress are supported by the extension rails, and a second bed frame and mattress are pivotally connected by a pair of parallel links to the first bed frame for pivoting movement between a storage position in which the second bed frame is supported above the first bed frame and a use position in which the second bed frame extends in substantially the same plane as the first bed frame.

6 Claims, 4 Drawing Sheets

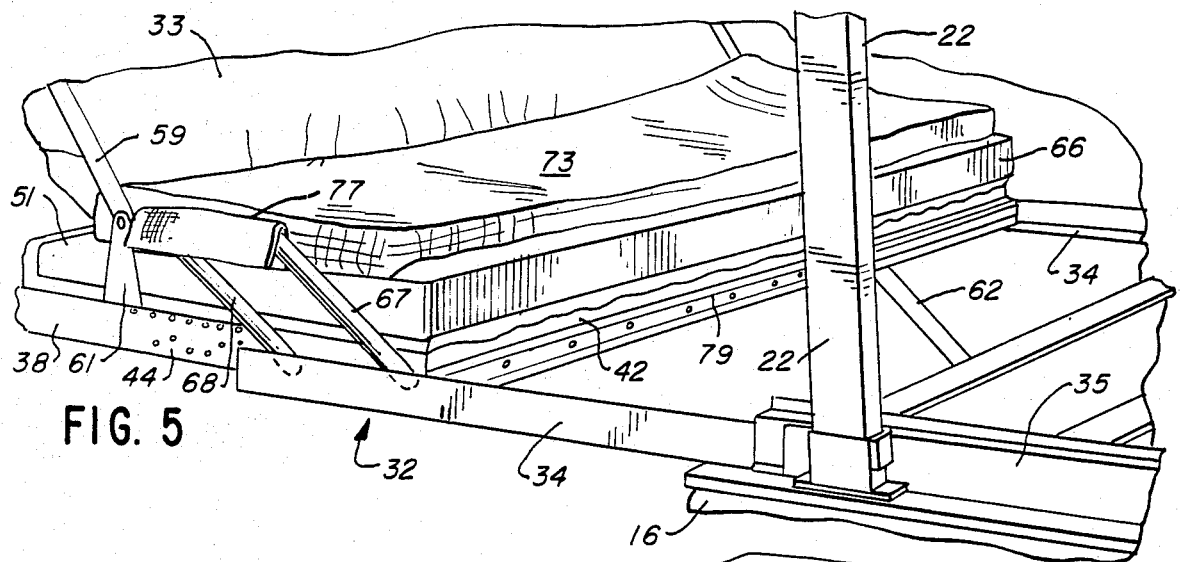
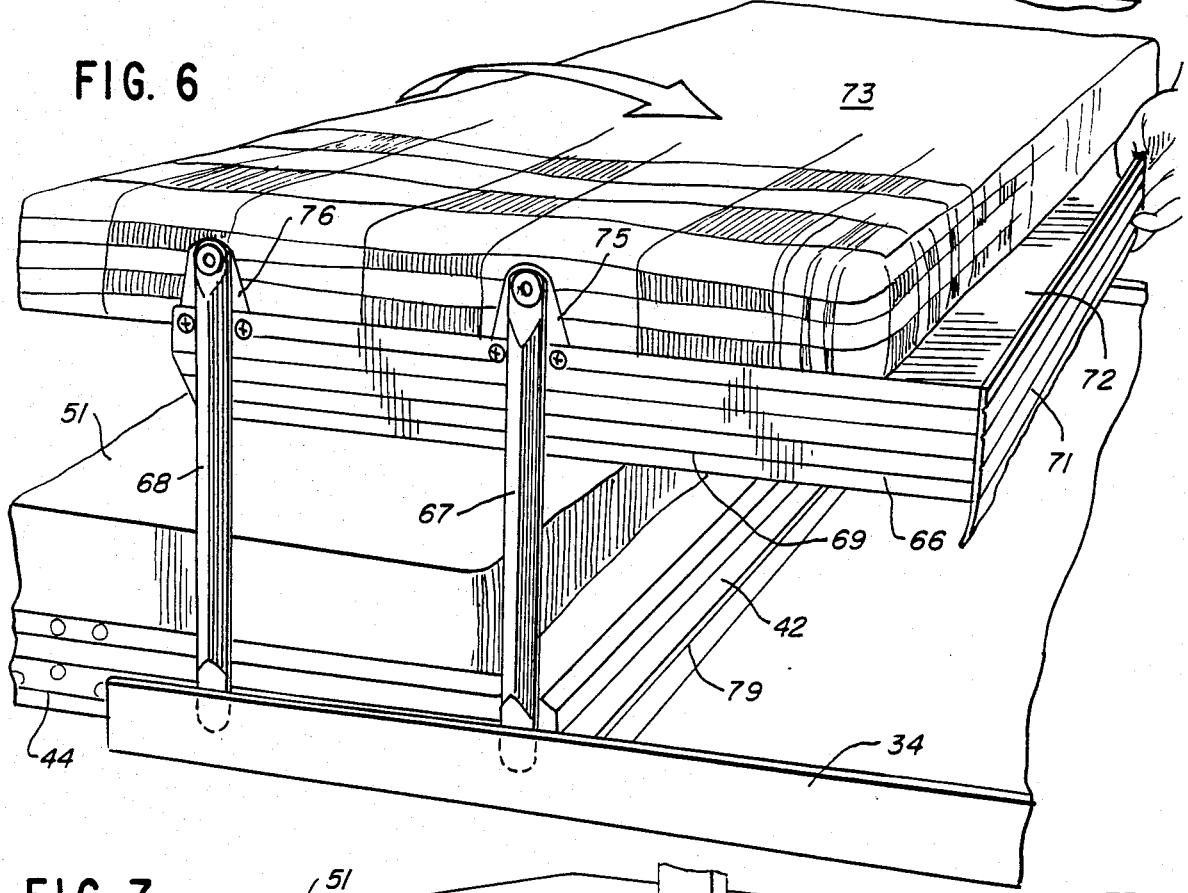
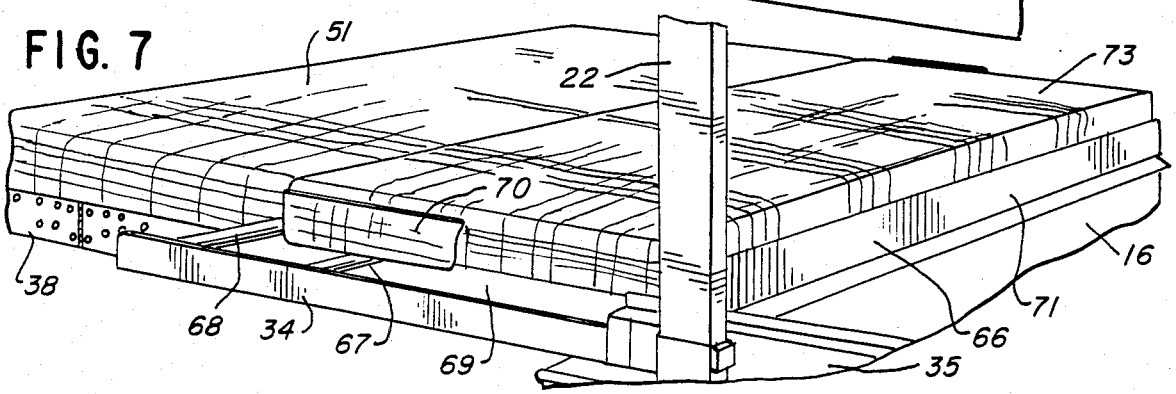

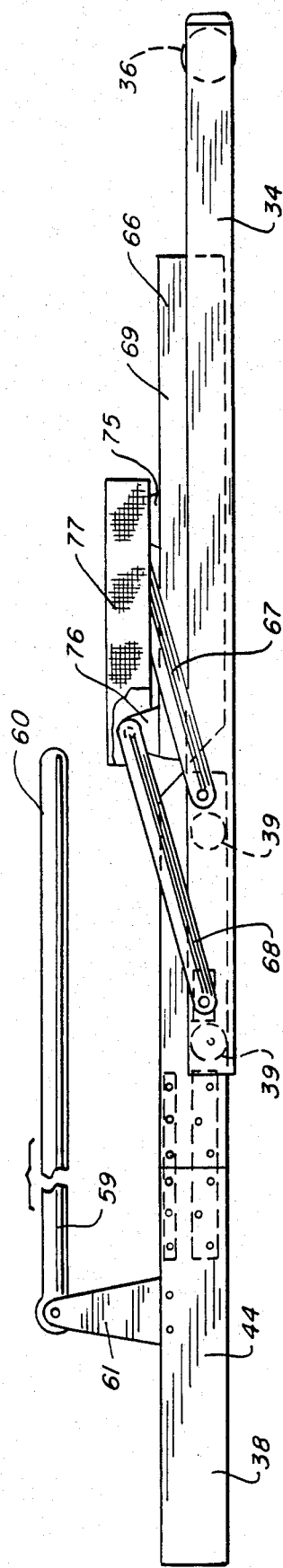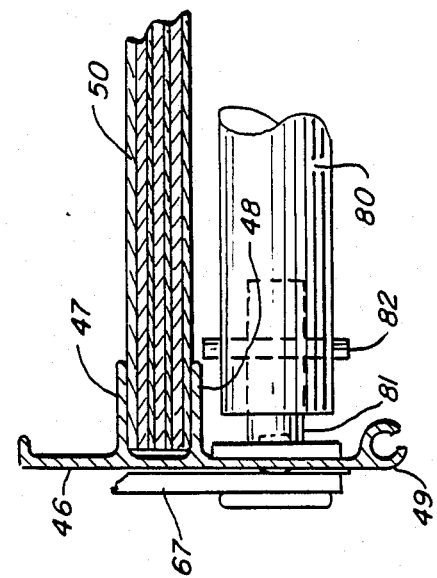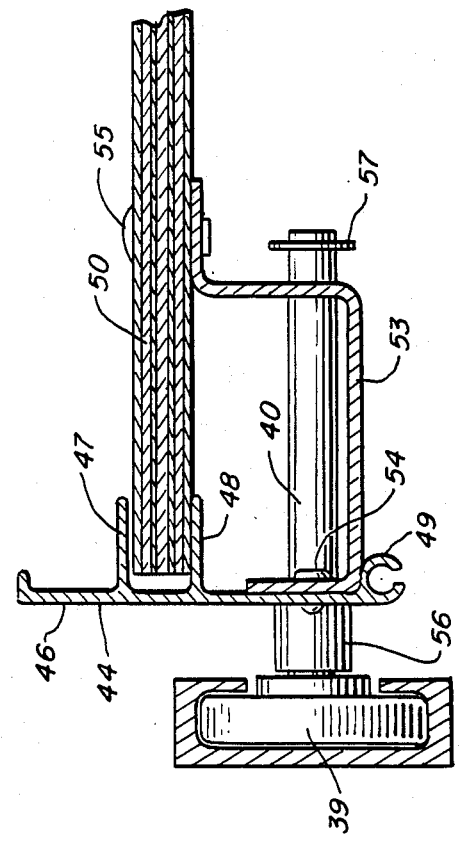

EXPANDABLE BED ASSEMBLY FOR CAMPING TRAILER

BACKGROUND AND SUMMARY

This invention relates to camping trailers, and, more particularly, to an expandable bed assembly for a camping trailer.

Camping trailers conventionally include a pair of bed wings which are adapted to extend outwardly from the trailer body in cantilever fashion when the trailer is set up for use. Each of the bed wings includes a pair of extension rails which are slidably mounted on rails on the sides of the trailer body. A bed frame is slidably supported by the extension rails. When the trailer is to be towed or stored, the bed wings are moved inside of the trailer body.

In one type of prior art trailer the length of the trailer body was 7 feet. It was desirable to utilize beds which were about 4½ feet wide, but two such beds were too wide to be stored side-by-side inside the 7 foot trailer body. One attempt to solve the problem was to make one of the beds and mattresses in two parts—a first bed and mattress which remained supported by bed extensions in the storage position and a second, smaller mattress which was removed from the bed frame and folded and stored and the smaller frame was folded onto the first bed frame for storage. The problem with this approach was that the folded mattress became creased and looked unattractive when opened up and the first mattress had to be removed so that the frames could be folded and then the mattress had to be placed back on top of the folded frame. This was awkward and made set-up longer.

A second attempt was to use three mattresses—a first mattress which remained supported by the bed frame in the storage position and two small mattresses which were stored inside the trailer. In use the two small mattresses were supported side-by-side on the bed frame and the trailer body and were retained in position by retaining brackets and straps. Disadvantages with this construction were that the two small mattresses took up storage space inside of the trailer and the set-up procedure was awkward because it was necessary to align the brackets and straps when installing the small mattresses.

The invention provides an expandable bed assembly in which the second mattress is supported by a second bed frame which is pivotally attached to the first bed frame by a pair of parallel links. During use the second bed frame is supported by the first bed frame and by the trailer body. The second bed frame is moved to the storage position simply by pivoting the second bed frame and the links outwardly until the second bed frame is supported above the first mattress. The second bed frame and mattress are stored in a space not normally used, i.e., on top of the first bed frame and mattress. The second mattress remains supported by the second bed frame at all times. Movement of the parallel links on the two sides of the bed frame is synchronized by a torsion bar which connects one link of each of the two pairs of parallel links. Set-up and tear-down of the bed assembly are therefore performed quickly and easily.

DESCRIPTION OF THE DRAWING

The invention will be explained in conjunction with an illustrative embodiment shown in the accompanying drawing, in which:

FIG. 5 is a fragmentary perspective view of the rear bed wing in the process of being set up;

FIG. 6 is a fragmentary perspective view showing the second bed frame being pivoted into its use position;

FIG. 7 is a fragmentary perspective view showing the second bed frame in the use position;

FIG. 9 is a side elevational view partially broken away, taken along the line 9—9 of FIG. 8;

FIG. 10 is a fragmentary sectional view taken along the line 10—10 of FIG. 8; and FIG. 11 is a fragmentary sectional view taken along the line 11—11 of FIG. 8.

DESCRIPTION OF SPECIFIC EMBODIMENT

Figure 1:
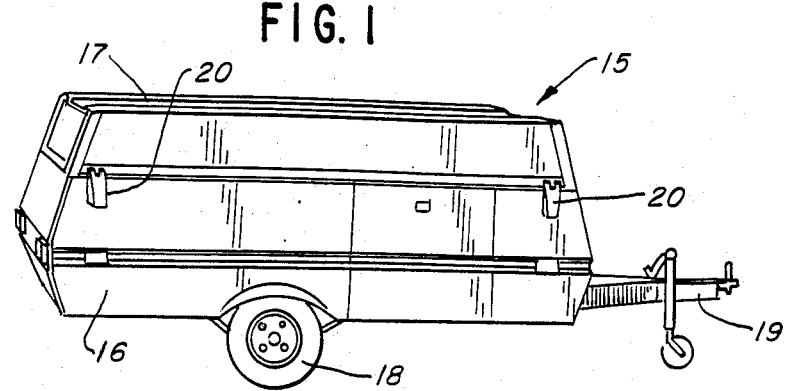
FIG. 1 is a perspective view of a camping trailer in its storage or towing configuration.

FIG. 1 illustrates a camping trailer 15 which includes a boxlike rectangular body 16 and a top 17. The trailer body is supported by a pair of wheels 18 and is towed by a tongue and trailer hitch 19 which extends from the front end of the body. The trailer is shown in its storage or towing configuration, and the top is latched to the body by latches 20.

Figure 2:
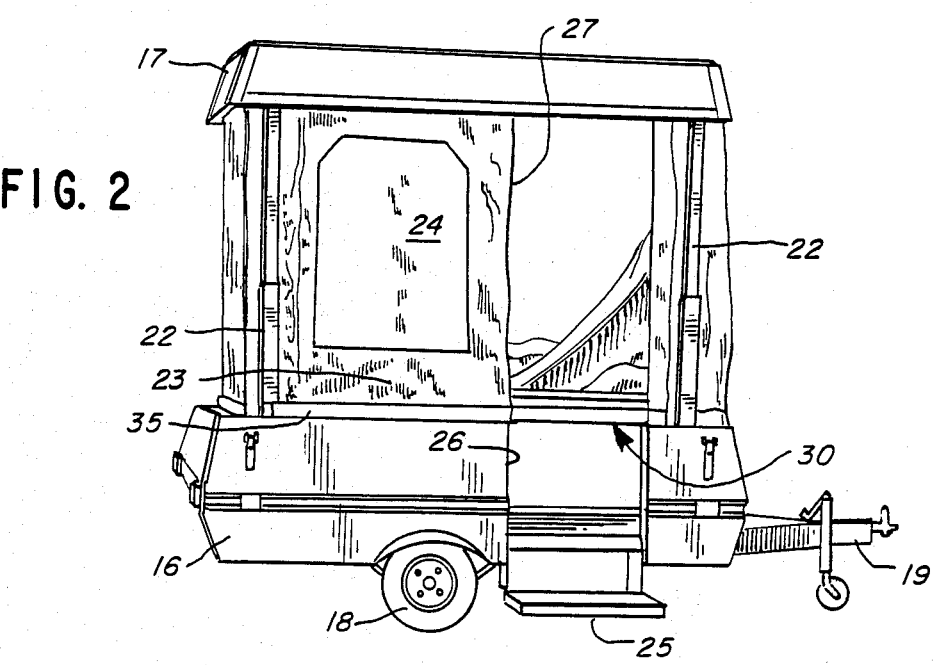
FIG. 2 a perspective view of the camping trailer in the process of being set-up for use.

FIG. 2 illustrates the trailer in the process of being set-up for use. The top 17 is raised by four telescoping support posts 22. The sides of the trailer between the top and the body are enclosed by canvas panels 23 which may be provided with mesh window panels 24. A portion of the side wall of the trailer body hinges downwardly to provide a step 25 and a door opening 26 in the trailer body, and a door opening 27 is provided in the canvas side panel. The details of such a camping trailer are conventional and well known in the art and need not be described therein.

The camping trailer includes a front bed wing assembly 30 (FIG. 2) which is slidably mounted on the sides of the trailer body and which is shown stored within the trailer body in FIG. 2. The front bed wing is also conventional and in use extends forwardly from the trailer body.

Figure 3:
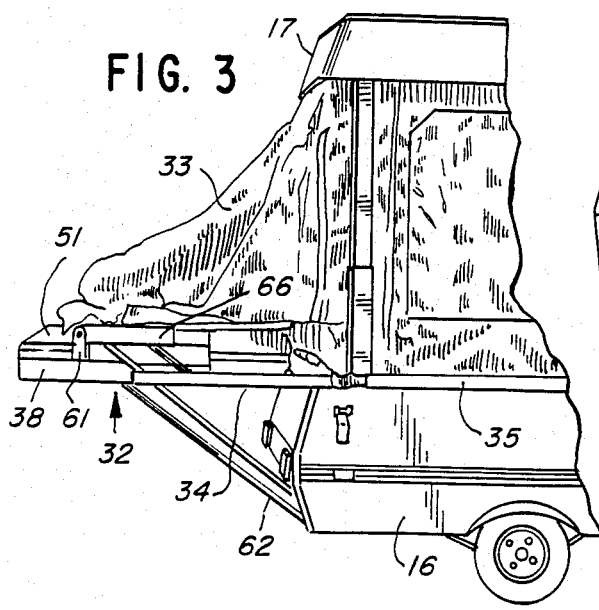
FIG. 3 is a fragmentary perspective view showing the rear bed wing extended.
Figure 4:
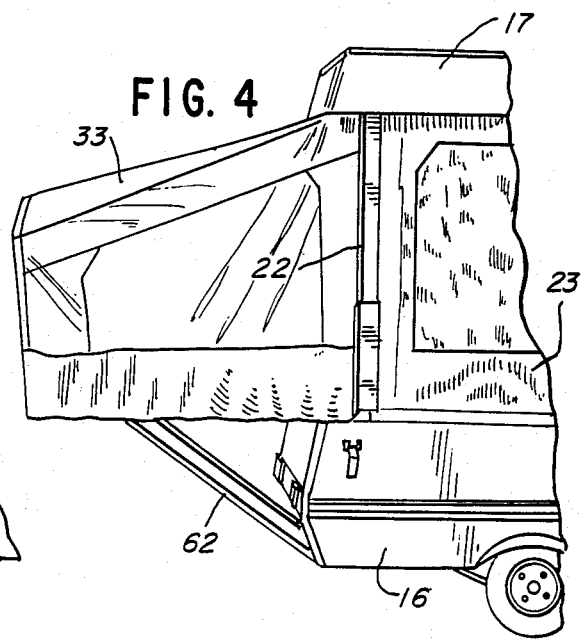
FIG. 4 a view similar to FIG. 3 showing the rear bed wing in its set-up or use position.

A rear bed wing assembly 32 (FIG. 3) is also slidably mounted on the sides of the trailer body. The rear bed wing is movable between a storage position in which the bed wing is positioned inside of the trailer body (FIG. 2) and a use position in which the bed wing extends rearwardly from the trailer body in cantilever fashion (FIG. 3). A canvas canopy 33 covers the rear bed wing assembly when the trailer is set up (FIG. 4).

The rear bed wing assembly includes a pair of extension rails 34 (see also FIGS. 5–9) which are slidably and telescopingly mounted within side channels 35 on the sides of the trailer body. A roller 36 (FIG. 9) is rotatably mounted on the forward end of each extension rail and rolls along the channel 35.

Figure 8:
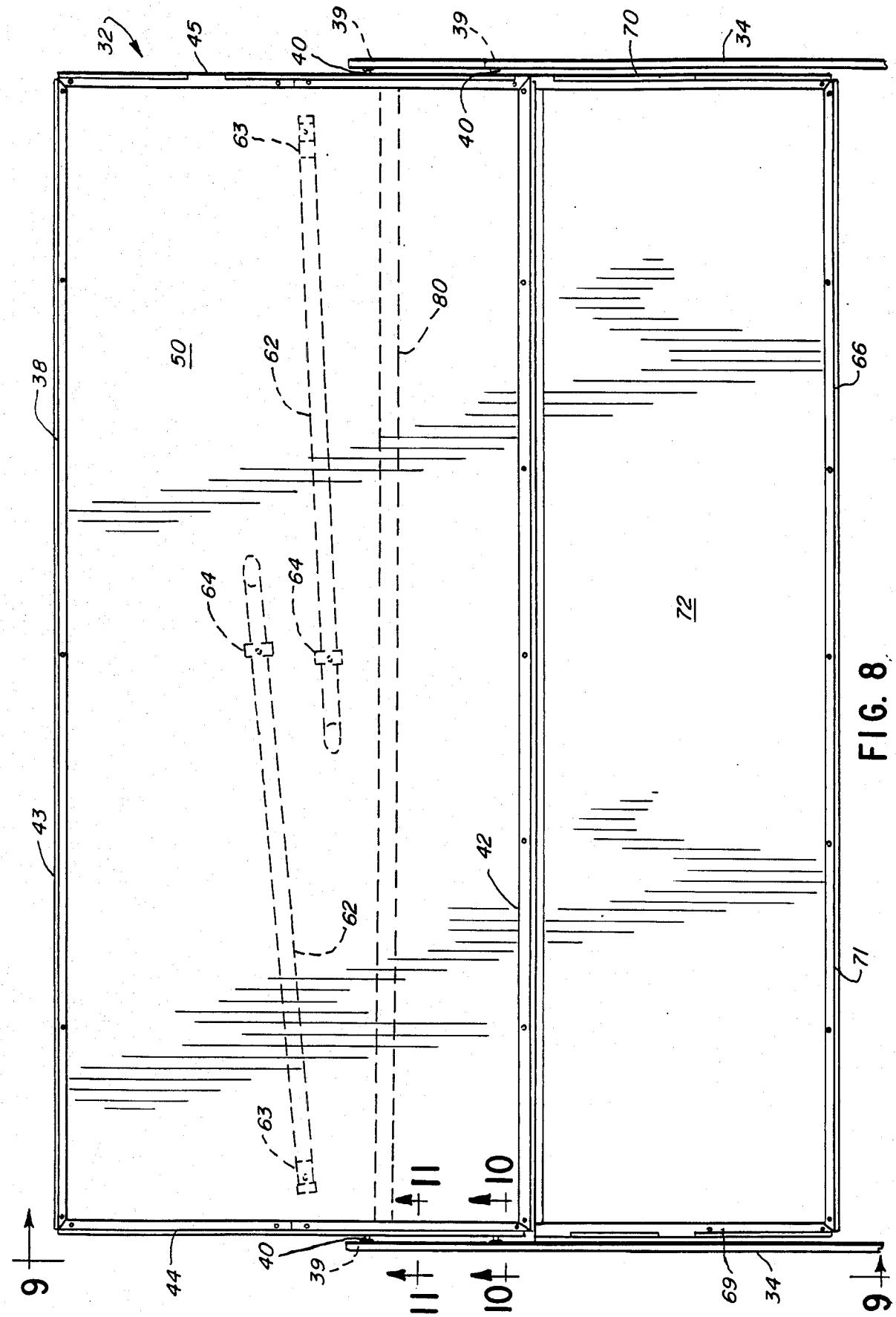
FIG. 8 is a top plan view of the first and second bed frames in their use positions.

A rear bed frame 38 is slidably supported by the extension rails 34. Referring to FIGS. 8–10, the rear portions of the extension rails are channel-shaped, and a pair of rollers 39 are mounted on the rear bed frame by axles 40.

The rear bed frame is generally rectangular and includes front and rear frame members 42 and 43 (FIG. 8) and side frame members 44 and 45. Each of the side frame members and the rear frame member is similarly shaped and includes a vertical wall 46 (FIGS. 10 and 11) and a pair of spaced-apart horizontal walls 47 and 48. The bottom of the vertical wall terminates in a channel 49 for retaining a vinyl bed seal extrusion on the front and rear of the bed. A rectangular mattress support panel 50 is retained in the space between the horizontal walls 47 and 48 and supports a rectangular mattress or cushion 51 (FIG. 3). The portion of the vertical wall 46 which extends above the mattress support panel retains the mattress on the panel. Referring to FIG. 10, each of the axles 40 for the rollers 39 extend through the vertical wall 46, and the inner end is supported by a U-shaped bracket 53 which is attached to the wall 46 by rivets 54 and to the mattress panel 50 by rivets 55. An annular spacer 56 positions the roller 39 relative to the vertical side wall 46, and a retaining ring 57 prevents the axle from being withdrawn from the bracket 53.

The roof portion of the canvas canopy 33 is supported by a pair of support rods 59 (FIG. 9) and a bow shaped cross rod 60 which are pivotally attached to the side frame members 44 and 45 by brackets 61. When the trailer is set up, the support rods and bow are rotated into position and support the roof of the canvas above the mattresses as illustrated in FIG. 4. The brackets 61 and rods 59 and 60 are omitted from FIG. 10 for clarity of illustration.

After the rear bed frame is extended away from the trailer body, it is supported by a pair of support rods 62 (FIGS. 3 and 4). Referring to FIG. 8, each of the support rods is pivotally attached to the bottom of the mattress support panel 50 by a mounting bracket 63 and is retained in a storage position against the panel 50 by a clip 64. When the rear bed frame is extended, the support rods 62 are removed from the clips 64 and positioned over receptacles in the back of the body.

The portion of the rear bed wing assembly which has been described up to this point is prior art and well known to those skilled in the art. As described in the Background portion hereof, the rear bed wing assembly has previously included either a single mattress for the space between the rear bed frame and the trailer body or a pair of mattresses which were arranged side-by-side between the extension rails 34. In both cases the mattresses had to be removed and stored inside of the trailer body during towing. Such prior art engagements also suffered from other disadvantages as previously described.

In accordance with the invention a rectangular front bed frame 66 is pivotally connected to the rear bed frame 38 by a pair of parallel links 67 and 68 on each side of the bed frames. The front bed frame is pivotable between a storage position illustrated in FIGS. 3 and 5 and a use position illustrated in FIGS. 7, 9, and 10.

The front bed frame includes a pair of side frame members 69 and 70 (FIG. 10) and a front frame member 71. Each of the frame members 69–71 has a shape similar to the frame members 42–45 of the rear bed frame, and a mattress support panel 72 is retained within the spaced-apart horizontal walls of the frame members. A rectangular mattress or cushion 73 is supported by the panel 72.

The upper ends of the parellel links 67 and 68 are pivotally attached to brackets 75 and 76 which are attached to side frame members 69 and 70 and extend upwardly therefrom. The lower ends of the parallel links are pivotally attached to the side frame members 44 and 45 of the rear bed frame 38.

In FIGS. 5, 7, and 9 the upper ends of the links 67 and 68 and the brackets 75 and 76 are covered by a fabric cover 77. The fabric is the same material as the covers of the mattresses to provide an aesthetically pleasing appearance, and the cover cushions the links and the brackets and provides protection therefrom. The cover is formed by folding and stitching a rectangular piece of fabric to form an envelope into which the links and brackets are inserted. The cover is omitted in FIG. 6 for clarity of illustration. A channel 79 (FIGS. 5 and 6) is attached to the front frame member 42 of the rear bed frame 38 for supporting the mattress support panel 72 of the front bed frame 66 when the front bed frame is in the use position.

The parallel links 67 and 68 on the two sides of the bed frames are connected for coordinated pivoting movement by a torsion tube 80 (FIG. 11) which extends between the rear links 68 below the mattress support panel 50. The links 68 are pivotally supported by a pin 81 which extends through the side frame member 46 and into the torsion tube 80. A retainer pin 82 extends through the retainer tube and the pin to connect them for common rotational movement. The pin 81 and the link 68 are also connected for common rotational movement.

FIG. 7 illustrates the front and rear bed frames 66 and 38 in the use positions The front and rear mattresses 73 and 51 extend in the same plane and provide a level sleeping surface. The front of the rear bed frame 38 is supported by the extension rails 34, and the rear of the rear bed frame is supported by the support rods 62 (FIGS. 3 and 4). The front of the front bed frame 66 is supported by the trailer body 16, and the rear of the front mattress support panel 72 is supported by the channel 79 of the rear bed frame.

The front bed frame is moved to its storage position by pivoting the front bed frame rearwardly on the parallel links 67 and 68 until the front bed frame is supported on the rear mattress 51 as shown in FIG. 5. The rear bed frame 38 can then slide into its storage position within the trailer body by sliding the rear bed frame inwardly along the extension rails 34 and sliding the extension rails inwardly along the side channel 35 on the trailer body. The front bed frame 66 and the front mattress 73 remain supported by the rear bed frame, and the front mattress is not removed during storage. However, the parallel links 67 and 68 permit the front bed frame to move out of the way of the front bed wing assembly 30 so that both the front bed wing assembly 30 and the rear bed wing assembly 32 can be stored within the front-to-rear length of the trailer body.

The rear bed wing assembly is moved to the use position by following the reverse procedure. The rear bed frame 38 is moved rearwardly by pulling the rear bed frame and the extension rails 34 rearwardly and then pivoting the front bed frame on the parallel links into the position illustrated in FIG. 7.

After the rear bed wing assembly 32 is set up, the canvas canopy 33 is secured by tucking the lower edges thereof under the bed frames and attaching them in the conventional manner. The edges of the canopy include an elastic cord which is sewn into the bottom hem of the canvas, and the cord is pulled over a multiplicity of lashing hooks which are attached to the bottom surfaces of the mattress panels 50 and 72 around the periphery thereof.

While in the foregoing specification a detailed description of the invention was set forth for the purpose of illustration, it will be understood that many of the details herein given may be varied considerably by those skilled in the art without departing from the spirit and scope of the invention.

I claim:

1. In combination with a camping trailer having a body with a pair of side rails, a bed assembly including a pair of extension rails slidably connected to said side rails, a first bed frame supported by said extension rails, a first mattress supported by the first bed frame, a second bed frame, link means for pivotally connecting the second bed frame to the first bed frame for pivoting movement between a storage position in which the second bed frame is supported above the first bed frame and a use position in which the second bed frame extends in substantially the same plane as the first bed frame, and a second mattress supported by the second bed frame.

2. The bed assembly of claim 1 in which said link means comprises a pair of parallel links pivotally connected to the first and second bed frames on each side thereof adjacent the extension rails.

3. The bed assembly of claim 2 including a torsion tube connecting one of the links on one side of the bed frame with one of the links on the other side of the bed frame.

4. The bed assembly of claim 2 including a pair of link brackets attached to each side of the second bed frame and extending upwardly therefrom, the links being pivotally connected to the link brackets.

5. The bed assembly of claim 4 including a cover removably mounted on each pair of link brackets.

6. The bed assembly of claim 1 including a first planar mattress support connected to the first bed frame and supporting the first mattress, a second planar mattress support connected to the second bed frame and supporting the second mattress, and support means on the first bed frame for supporting one end of the second mattress support when the second bed frame is in the use position.

* * * * *